United States Patent [19]

Dillon

[11] 3,751,762
[45] Aug. 14, 1973

[54] MULTIPLE FOWL CARRYING APPARATUS
[75] Inventor: Janus J. Dillon, Irving, Tex.
[73] Assignee: Food Equipment Inc., Dallas, Tex.
[22] Filed: Sept. 20, 1971
[21] Appl. No.: 181,840

[52] U.S. Cl. .................................. 17/11 R, 17/44.1
[51] Int. Cl. ............................................ A22c 21/00
[58] Field of Search ............................... 17/11, 44.1

[56] References Cited
UNITED STATES PATENTS

| | | | |
|---|---|---|---|
| 3,166,785 | 1/1965 | Lemmond | 17/44.1 |
| 3,593,368 | 7/1971 | Cox | 17/11 X |
| 2,649,616 | 8/1953 | Swanson | 17/44.1 |
| 3,124,831 | 3/1964 | Altenpohl | 17/11 |

Primary Examiner—Louis G. Mancene
Assistant Examiner—D. L. Weinhold
Attorney—Richards, Harris & Hubbard

[57] ABSTRACT

A multiple fowl carrying apparatus useful in automated fowl processing includes a shackle mounting frame. The mounting frame is connected to a conveyor system that routes it through certain unit operations, which can include washing, chilling and preparation for packaging. The shackle mounting frame carries a plurality of pivotally mounted shackles, movable between a first and a second position. In the first position the shackles can suspend a fowl by its legs in a processing position. When the shackles are pivoted to the second position, the fowl will drop from the shackles, readying them for further processing, packaging or the like. The apparatus includes mechanism for holding the shackles in the first position and for releasing the shackles so they can pivot to the second position. The shackles are counterweighted about the pivotal mounting so that in the absence of a fowl they are biased toward the first position.

9 Claims, 6 Drawing Figures

PATENTED AUG 14 1973

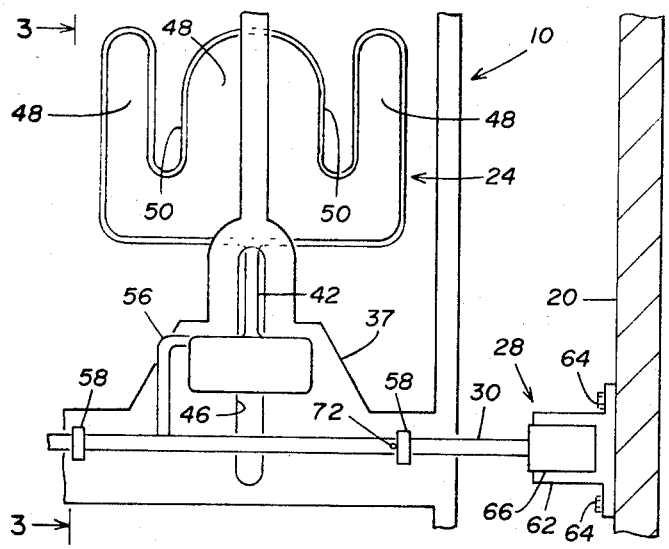
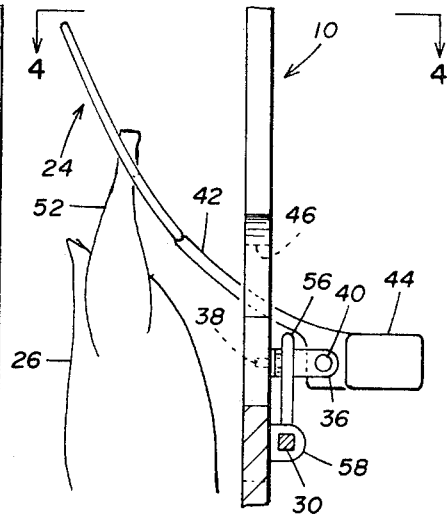
FIG. 2
FIG. 3
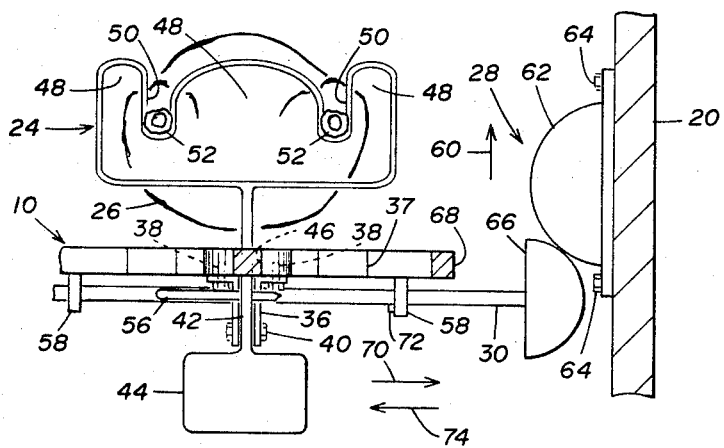
FIG. 4
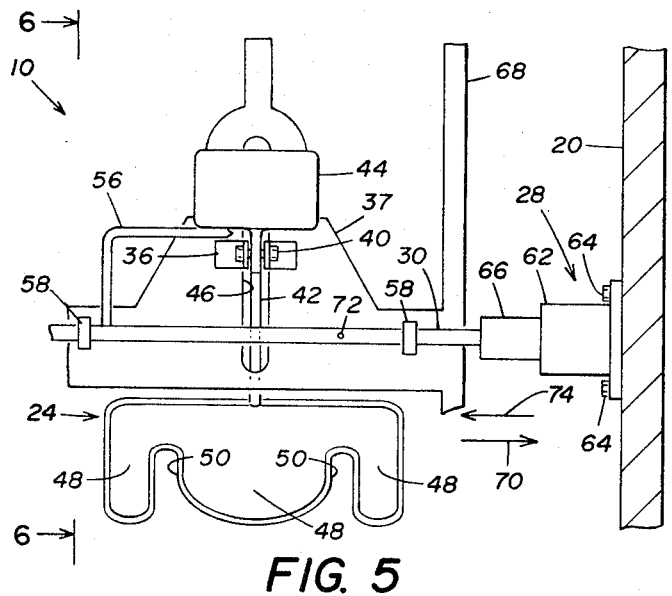
FIG. 5
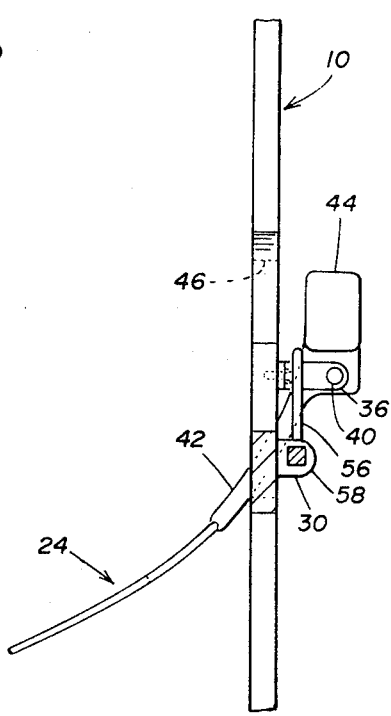
FIG. 6

MULTIPLE FOWL CARRYING APPARATUS

BACKGROUND OF THE INVENTION

This invention relates to a fowl processing apparatus and more particularly to a conveyor mountable apparatus for suspending a plurality of fowl in a suitable processing position.

Due to an increased demand for edible, ready-to-cook fowl, the fowl processing industry is converting to automated procedures in order to increase production. Presently, fowl such as chickens are initially prepared for processing by passing the fowl through killing, scalding and feather removing stations. The remaining feathers, pin feathers and the like are then removed by singeing with an open flame. The fowl is thereafter eviscerated and washed both internally and externally. Subsequently, the fowl is chilled and packaged for retail sale. Many of the foregoing operations are carried out on a production line in which the fowl are suspended from shackles connected to a conveyor system. The conveyor is routed through various processing zones in which these operations are conducted manually or by a combination of mechanized and manual procedures.

Present conveyor systems for routing fowl through the various processing zones employ various shackle structures. These structures include a simple wire loop arrangement into which a fowl must be manually inserted and from which it must be manually removed. Automatic mechanized removal of fowl has been incorporated into other shackle structures but these shackles have often presented maintenance and operational problems due to their relatively complex construction. Moreover, all prior shackle structures have not been capable of handling more than one or two chickens from a single suspension point on a conveyor system. Because of the desire within the fowl processing industry to increase production, need has thus arisen for multiple fowl shackle structures which are simple in construction and operation.

SUMMARY OF THE INVENTION

The present invention therefore provides a conveyor mountable apparatus for suspending a plurality of fowl in a processing position comprising a frame, a plurality of shackles movably mounted on the frame, the shackles being movable between a first position and a second position, the shackles including means for retaining fowl when in the first position and for releasing fowl when in the second position, and releasable means for holding the shackles in the first position. In a preferred embodiment, the shackles comprise a body pivotally mounted on the frame and at least two spaced arms extending outwardly from the body. The arms are spaced at a distance such that the leg of a fowl can be slidably inserted and retained between the arms. The arms are upturned when the shackles are in the first position and are downturned when the shackles are in the second position.

BRIEF DESCRIPTION OF THE DRAWINGS

FIG. 2 is an enlarged front elevation view of the portion of the shackle apparatus of FIG. 1 outlined in dotted lines;

FIG. 3 is a cross sectional view of FIG. 2 taken along section line 3—3;

FIG. 4 is a cross sectional view of FIG. 2 taken along section line 4—4;

FIG. 5 is an enlarged front elevation view similar to that of FIG. 2 showing a shackle in the released position; and FIG. 6 is a cross sectional view of FIG. 5 taken along section line 6—6.

DESCRIPTION OF THE PREFERRED EMBODIMENT

Figure 1:
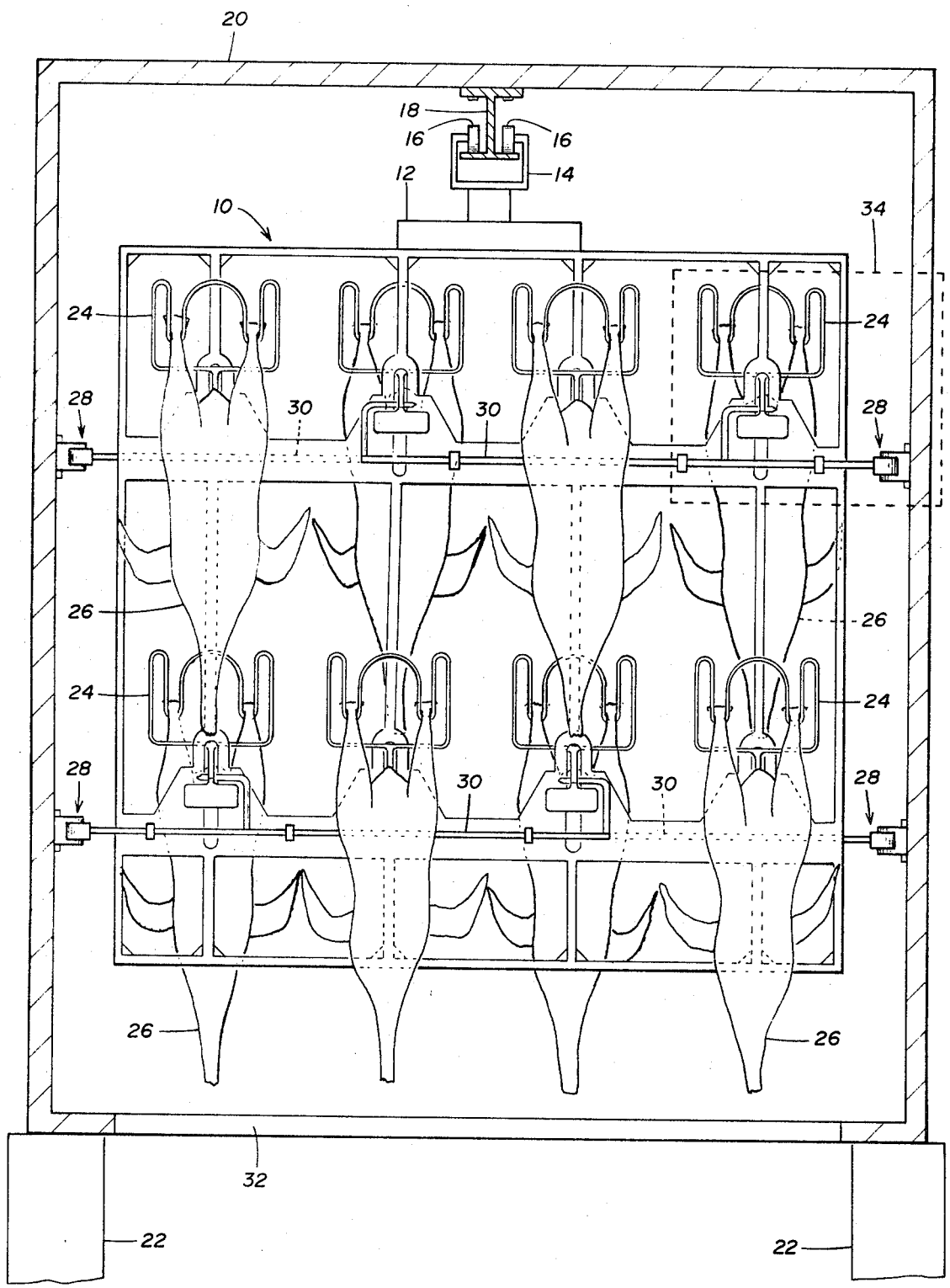
FIG. 1 is a front elevation view in partial cross section of the multiple fowl shackle apparatus of the present invention mounted on an enclosed conveyor.

Referring to FIG. 1, a shackle mounting frame, generally designated 10, is attached with suitable fasteners via bracket 12 to a conveyor trolley 14. The conveyor trolley 14 has wheels 16 thereon which ride on rail 18. Rail 18 is in turn fastened to housing 20, which encloses a fowl processing, production line operation. The housing 20 can contain apparatus for washing or chilling the fowl carried on the mounting frame 10. Housing 20 is secured on a foundation by suitable supports 22.

The shackle mounting frame 10 carries a plurality of single fowl shackles 24. Each of the shackles 24 is capable of suspending a chicken 26 or other processable fowl by its legs. The particular shackle arrangement shown here is best adapted for use after a chicken has been deheaded and has had its feet removed. The shackle mounting frame 10 also carries apparatus, actuated by coaction of cam surfaces 28 and push rods 30, which will release shackles 24 so that they can move to a position where the chickens 26 can drop from the shackles 24. As shown in FIG. 1, the cam surfaces 28 are so arranged to release shackles 24 at a position where the chickens 26 can drop through opening 32 in th bottom of the housing 20. A suitable hopper, container or other conveyance means can be situated below the opening 32 to transport the chickens 26 to other processing lines or to a packaging operation.

The shackles 24 and the operation thereof will be discussed in greater detail with reference to the remaining FIGURES. FIG. 2 is an enlarged front elevation view of the portion of FIG. 1 outlined by dotted lines 34. FIGS. 3 and 4, which will be described conjointly with FIG. 2, are cross sectional views of FIG. 2 along section lines 3—3 and 4—4.

The individual shackle 24 is pivotally attached to the shackle mounting frame 10 through yoke 36. Yoke 36 is formed of two L-shaped bars which are fastened to a shackle mounting plate 37 by suitable fasteners 38 forming a part of frame 10. A pivot pin 40 extends through the body 42 of the shackle 24 and through mating holes in the yoke 36. A counterweight 44 is attached to the body 42 of shackle 24 on one side of the pivot pin 40. The body 42 of the shackle 24 extends through a slot 46 in the shackle plate 10. Shackle arms 48 are secured at the opposing extremity of the shackle body 42 extending through slot 46. In the preferred embodiment of the body 42, counterweight 44 and shackle arms 48 are integrally constructed. The shackle arms 48 are spaced apart to form two elongate slots 50 into which the legs 52 of a chicken 26 can be inserted. The slots 50 are sufficiently narrow such that the joint at the end of leg 50 will not pass through the slots 48, thus suspending the chicken 26 from the arms 48 of shackle 24.

The shackle 24 is held in the upright position shown in FIGS. 2, 3 and 4 by means of a bolt 56 which is situated between the upper portion of yoke 36 and the lower portion of bushings shackle body 42 and between mounting plate 37 and pivot pin 40. Bolt 56 has a downturned portion which is securely fastened to push rod 30 by welding or other suitable fastening means. Push rod 30 is mounted for sliding reciprocable motion in bushings 58. Rotation of push rod 30 about its longitudinal axis is prevented by its square cross section mating with the square openings in bushing 58.

Referring specifically to FIG. 4, the shackle mounting frame 10 is moved by the conveyor system to which it is connected in a directional path indicated by arrow 60. A cam 62 is mounted on a wall of the housing 20 by suitable fasteners 64 at a predetermined location along the conveyor path. A cam follower 66 is securely fastened to the end of push rod 30 which extends beyond the edge 68 of the shackle plate 37. Before the cam surfaces mate, the push rod 30 is fully extended in the direction of arrow 70 such that the stop pin 72 engages the side of bushing 58. In this position, bolt 56 will retain the shackle 24 in its upright position. As the cam follower 66 advances into contact with the cam 62, the push rod 30 is actuated in a direction of arrow 74. As push rod 30 moves in the direction of arrow 70, the bolt 56 is moved to the position shown in FIG. 5, thus disengaging it from its position in contact with the bottom of shackle body 42. The weight of the chicken 26 (FIG. 4) will cause the shackle 24 to move downwardly to the position shown in FIGS. 5 and 6. The weight of the chicken 26 and arms 48 will counteract the force exerted by counterweight 44. The arms 48 of the shackle 24 are thus forced to a downturned position. The shackle arms 48 are no longer capable of holding the chicken 26 by its legs, thus allowing it to slide out of the slots 50 and to drop from the end of arms 48.

After the bird has dropped from the shackle 24, the force exerted by counterweight 44 will overcome the leverage exerted by shackle arms 48. Shackle 24 will thus automatically return to the original position as shown in the FIGS. 2, 3 and 4. To lock the shackle 24 in its upright position, push rod 30 can thereafter be manually moved in the direction of arrow 70 (FIG. 4) until stop pin 72 again engages the side of bushing 58. Thus bolt 56 reengages the bottom of shackle body 42 preventing downward motion of the arms 48 when another chicken is placed in the shackle 24.

Referring back to FIG. 1, it will be seen that eight single shackles 24 are mounted on the shackle frame 10. The shackles are operated in tandem, thus requiring four separate push rods and four cam surfaces 28 mounted on housing 20. It is to be understood that the preferred arrangement for retaining the shackles in an upright position has been described. Other suitable mechanisms can be employed as desired. It is also to be understood that instead of manually returning the push rod to its retention position as discussed in connection with FIGS. 4 and 5, an additional cam and follower surface can be provided to automatically return the push rod 30 to its retention position.

Other various changes, alterations and substitutions of equivalents which are within the knowledge of one of ordinary skill in the present art can be made without departing from the concept disclosed herein. It is intended that the present invention be limited only by the definition contained in the appended claims.

What is claimed is:

1. A conveyor mountable apparatus for suspending a plurality of fowl in a processing position, comprising:
   a frame,
   a plurality of shackles movably mounted on said frame, said shackles movable between a first position and a second position,
   each of said shackles including a body pivotally mounted on said frame,
   at least two spaced arms extending outwardly from said body, said arms spaced at a distance such that a leg of a fowl can be slidably inserted and retained between said arms, said arms being upturned when said shackle is in said first position and being downturned when said shackle is in said second position,
   means for retaining fowl when in said first position and for releasing fowl when in said second position including a counterweight connected to said body and extending from said body in a direction opposed to that of said arms,
   releasable means for holding said shackles in said first position, and
   means for returning a shackle from said second position to said first position.

2. The apparatus of claim 1 wherein said frame comprises:
   relatively flat rectangular framework including a plurality of mounting plates, said body of said shackles being pivotally mounted on one side of said mounting plates, said arms extending through openings in said plates to the other side thereof.

3. The apparatus of claim 2 wherein said body is pivotally mounted by a pivotal mounting including a yoke mounted on one side of said frame and a pivot pin connecting said yoke and said body of said shackle.

4. The apparatus of claim 3 wherein for each of said shackles said releasable means comprises:
   a bar movably mounted between a first and second position on said frame, said bar in said first position mating with a retention surface on said shackle, said bar in said second position disengaged from said retention surface,
   means for moving said bar between said first and second positions.

5. The apparatus of claim 4 wherein said frame is mounted for movement along an overhead conveyor which is connected to a substructure, said bar being reciprocably mounted between said first and second positions, said means for moving said bar comprising:
   an extension on said bar extending beyond the edge of said frame,
   a stationary member mounted at a predetermined location near the path of said frame as it moves along said conveyor,
   mating cam and follower surfaces attached to said extension and said stationary member which when actuated by the movement of said frame past said stationary member will cause said bar to be moved from said first position to said second position.

6. An apparatus for suspending a plurality of fowl in a processing position comprising:
   a frame including means for connecting said frame to a conveyor system, a plurality of shackle bodies pivotally mounted on said frame, each of said bodies pivotable between a first position and a second position, spaced arms extending outwardly from each body, said arms spaced to slidably receive a leg of fowl and retain the leg between said arms, said arms being upwardly directed when said body is in said first position and being downwardly directed when said body is in said second position, releasable means for holding each body in said first position, and a counterweight connected to each body and extending therefrom in a direction opposed to that of said arms, said counterweight being of sufficient weight to return said body and arms from said second position to said first position.

7. The apparatus of claim 6 wherein said frame comprises:

a relatively flat rectangular member, each of said bodies being pivotally mounted on one side of said frame and extending through openings in said frame to the other side thereof, said arms connected to the portion of a body extending through said frame.

8. The apparatus of claim 7 wherein said releasable means for each of said shackle bodies comprises:

a bar movably mounted between a first and second position on said frame, said bar in said first position mating with a retention surface on a shackle body, said bar in said second position disengaged from said retention surface.

9. The apparatus of claim 8 further comprising:

means for moving said bar between said first and second positions.

* * * * *